Sept. 8, 1936.                J. N. HELMAN                2,053,907
                  TEMPLE CONNECTION FOR SPECTACLES
                       Filed April 30, 1934
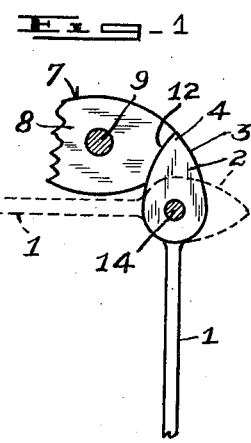
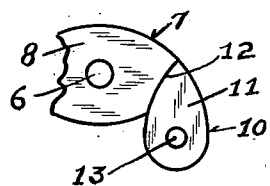
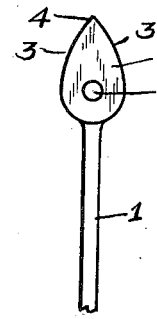
INVENTOR
Joseph N. Helman
By Jack R. Snyder
       attorney Patented Sept. 8, 1936

2,053,907

UNITED STATES PATENT OFFICE 2,053,907

TEMPLE CONNECTION FOR SPECTACLES

Joseph N. Helman, Wilkinsburg, Pa.

Application April 30, 1934, Serial No. 723,123

1 Claim. (Cl. 88—53)

My invention relates to a temple connection for spectacles, and important objects thereof are to provide a temple connection of the character described, which is reversible permitting the selective attachment of the temple in the hinge members of the clamp at either side of the spectacle frame, which embodies a connecting head having the outer portion of its periphery disposed exactly flush with the outer portions of the peripheries of the associated hinge members when the temple is in the spread or extended position, and which has a substantial abutting area in the hinge members to counteract the normal leverage or pull of the extended temple.

Further objects of the invention are to provide a device of the class stated, which is simple in its construction and arrangement, strong, durable and efficient in its use, compact, attractive in appearance, and comparatively inexpensive to manufacture.

With the foregoing and other objects in view which will appear as the description proceeds, the invention resides in the novel construction, combination and arrangement of parts herein specifically described and illustrated in the accompanying drawing, but it is to be understood that the latter is merely illustrative of an embodiment of the invention, and that the actual needs of practice and manufacture may necessitate certain mechanical variations from the embodiment shown. It is, therefore, not intended to limit the invention to the disclosure thereof illustrated, but rather to define such limitations in the scope of the claim hereunto appended.

In the drawing wherein like numerals of reference designate corresponding parts throughout the several views:

Figure 1 is an enlarged, fragmentary plan view of a hinge clamp section and illustrating the attachment of the temple therewith.

Figure 2 is a similar view of the hinge clamp section, and Figure 3 is a like view of the temple.

Referring in detail to the drawing 1 denotes a spectacle shaft or temple, of any suitable material and construction, provided with an integrally formed and longitudinally aligned connecting head 2. The latter is horizontally flat and substantially ovate-acuminate or ovate-oblong in configuration, having uniform convexly curved side edges 3 converging to a pointed end 4 at the free outer end and at the longitudinal center thereof. The connecting head is provided with a pivoting aperture 5, which is disposed concentrically in and to the attached end portion of the connecting head, but eccentrically relatively to the pointed free end 4 thereof.

The spectacle temple 1 is pivotally attached in the spectacle end piece or frame clamp 7. The latter comprises a pair of similar, super-imposed, separate sections 8, which are adjustably secured together by means of a clamping screw 9 engaged in apertures 6 formed in said sections. The clamp sections 8 combinedly provide a hinge member 10, which projects rearwardly and is formed to provide a connecting groove 11 for the reception of the temple connecting head 2.

The contour of the connecting groove 11 is preferably identical to the configuration of the connecting head 2, and includes an inner wall 12 having a concaved curvature conforming to the convex curvature of either side edge 3 of the connecting head 2.

The hinge member 10 is provided with an aperture 13 for the engagement of the pivoting pin 14, which also extends through the aperture 5 in the connecting head 2 for pivotally connecting the latter in the hinge member.

A most important feature of the present invention is that, when the temple 1 is spread or extended at right angles to the spectacle frame or to its position in use, the entire exposed peripheral edge of the connecting head 2 is disposed precisely and exactly flush with the peripheral edge of the hinge member 10, as clearly illustrated in Figure 1. Such connection of the temple in the hinge member provides a finished and attractive appearance highly desirable in the art appertaining thereto.

When the temple 1 is extended for use, the inner edge of the connecting head 2 will engage the entire inner wall 12 of the hinge member 10, thereby providing a substantial abutting area or purchase capable of effectively withstanding the constant strain imposed upon it by the lateral spread of the temple imparted by the normal engagement of the latter against the head of the user.

As the hinge member 10 projects rearwardly from the frame clamp 7, the connection of the temple 1 permits the latter to be folded to extend parallel to and against the spectacles in the usual manner, and as indicated in dash lines in Figure 1.

It will here be noted that my improved temple connection is equally adaptable for attachment to the clamp or end elements of either the rimmed or rimless type of spectacles.

The present invention provides a most efficient device of its kind, which permits the attachment of the temple to either side of the spectacles without necessitating any changes to said temple or to the associated hinge structure, thereby obviously eliminating the necessity of providing right and left temples as now universally required in the art. Further the superficial appearance of my improved temple connection is comparable and, in many instances, superior to analogous and conventional structures now in use.

What I claim is:

In combination, a reversible temple connection for spectacles comprising an end piece including an ovate-oblong shaped rearwardly extending hinge member provided with a horizontally disposed connecting groove, a reversible shaft, a flat connecting head formed integral with the forward end of said shaft and longitudinally aligned with the latter, means for pivotally securing said connecting head in said connecting groove, said groove forming in the end piece a curved inner wall, said wall having a curvature symmetrical to the outer edge of the end piece about an axis extending forwardly through the pivot, said connecting head being ovate-oblong in contour and having symmetrically disposed curved side edges converging at the forward end of said connecting head, the contour of said connecting head being identical to the conformation of said inner wall and outer edge of the end piece so that either of the side edges of the said connecting head may be disposed to engage the entire length of said inner wall while the other of said side edges of said connecting head extends flush with the outer side edge of said hinge member.

JOSEPH N. HELMAN.